United States Patent [19]

Falk et al.

[11] Patent Number: 5,391,639
[45] Date of Patent: Feb. 21, 1995

[54] BLENDS OF POLYPHENYLENE ETHER AND MODIFIED POLYESTERS

[75] Inventors: John C. Falk, Northbrook, Ill.; Klementina Khait, Parkersburg, W. Va.

[73] Assignee: General Electric Company, Pittsfield, Mass.

[21] Appl. No.: 243,727

[22] Filed: May 17, 1994

Related U.S. Application Data

[60] Continuation of Ser. No. 555,117, Jul. 19, 1990, abandoned, which is a division of Ser. No. 263,382, Oct. 27, 1988, Pat. No. 4,956,422.

[51] Int. Cl.$^6$ ............... C08L 25/04; C08L 67/02; C08L 71/12
[52] U.S. Cl. ................... 525/392; 525/397; 525/905
[58] Field of Search ............ 525/392, 397, 905

[56] References Cited

U.S. PATENT DOCUMENTS

| | | | |
|---|---|---|---|
| 4,090,996 | 5/1978 | Gergen et al. | 525/92 |
| 4,804,711 | 2/1989 | Ishihara | 525/146 |
| 4,902,753 | 2/1990 | Brown et al. | 525/68 |
| 4,956,422 | 9/1990 | Falk et al. | 525/392 |
| 5,011,889 | 4/1991 | Hamersma et al. | 525/68 |

FOREIGN PATENT DOCUMENTS 0313841 9/1988 European Pat. Off. .

OTHER PUBLICATIONS

Polymer–Polymer Miscibility. Academic Press. New York. (1979). pp. 210–211.

*Primary Examiner*—James J. Seidleck
*Assistant Examiner*—Thomas Hamilton, III

[57] ABSTRACT

Thermoplastic blend compositions comprise polyphenylene ethers blended with modified polyesters. The modified polyesters comprise linear polyesters, such as polyalkylene terephthalate, modified with hydroxy- or carboxy-terminated polystyrene. The blends have good solvent resistance, heat distortion temperature, and gloss.

Methods for preparing blends of polyester and polyphenylene ether are also described. They involve modifying the polyester with hydroxy- or carboxy-terminated polystyrene, prior to blending with the polyphenylene ether.

11 Claims, No Drawings

BLENDS OF POLYPHENYLENE ETHER AND MODIFIED POLYESTERS

This is a continuation of application Ser. No. 07/555,117, filed Jul. 19, 1990, now abandoned, which is a divisional of Ser. No. 263,382, filed Oct. 27, 1988, now U.S. Pat. No. 4,956,422, issued Sep. 11, 1990.

FIELD OF THE INVENTION

The present invention relates to blend compositions of polyphenylene ether and a polyester, for example polybutylene terephthalate. More specifically, the present invention relates to blend compositions comprising polyphenylene ether and a polyester which has been modified with a hydroxy- or carboxy-terminated polystyrene.

BACKGROUND OF THE INVENTION

Polyphenylene ether resins are known in the art and exhibit a desirable combination of chemical, physical and electrical properties over a temperature range of more than about 650° F. extending from a brittle point of about −275° F. to a heat distortion temperature of about 375° F. This combination of properties renders polyphenylene ether resins suitable for a broad range of applications. However, the usefulness of polyphenylene ether resins is limited in some applications as a consequence of processability, impact resistance and chemical resistance. It is known to modify polyphenylene ether resins with various compounds in order to improve the processability and the impact and chemical resistances of the resins. Alternatively, polyphenylene ether resins have been blended with other resins in order to improve their undesirable properties.

However, as is well known in the polymer art, blending of polymers often leads to disappointing results. Most polymers are not actually soluble in one another, and even if they are intimately mixed by mechanical means, the existence of phase boundaries between the components can result in poor overall physical and mechanical properties. For example, when polyphenylene ethers are blended with linear polyesters, such as polybutylene terephthalate, which are known to have good chemical resistance, the resulting blends generally are of poor quality owing to the incompatibility of the polyphenylene ether and the polyester. The blends exhibit poor interfacial adhesion between the component polymer phases and thus poor mechanical properties, as well as poor surface appearance and low heat distortion temperatures.

Various blending strategies which have been employed in the art include the use of plasticizing additives and styrene-butadiene copolymer resins as taught by the Lee U.S. Pat. No. 4,123,410. Lee discloses the use of large amounts of the plasticizer, preferably 10 to 15 percent, which results in a loss of heat distortion temperature. Such compositions including the plasticizer are also less apt to retain their properties when exposed to solvents, since the plasticizer may be extracted by the solvent.

Blending of polyphenylene ethers with polyesters has also been accomplished by including phenoxy resins in combination with the polymers as disclosed in European Patent Application No. 148,774. However, the resulting blends are quite brittle. The phenoxy resin content also may be expected to lessen the solvent resistance of the blend.

It is an object of the present invention to provide blend compositions of polyphenylene ether and a polyester such as a linear polyester, which compositions exhibit good chemical and solvent resistance and good flowability during molding, as well as good mechanical and thermal properties of the molded product.

It is a further object of the present invention to provide a process which facilitates the blending of a polyphenylene ether with a polyester such as polybutylene terephthalate.

SUMMARY OF THE INVENTION

These and additional objects are provided by the present invention which comprises blend compositions of a polyphenylene ether and a property-improving amount of a polyester which has been modified with a hydroxy- or carboxy-terminated polystyrene. The blend compositions have been found to exhibit good flow properties in molding, together with good chemical solvent resistance and mechanical properties of the molded plastic. Particularly favorable results are obtained when the polyester is a linear polyester such as a polyalkylene terephthalate, for example, polybutylene terephthalate. These and additional objects and advantages will be more fully understood in view of the following detailed description.

DETAILED DESCRIPTION

Polyphenylene ether resins adapted for use in the thermoplastic blend compositions of the present invention comprise polymers and copolymers having repeating structural units of the following general formula:

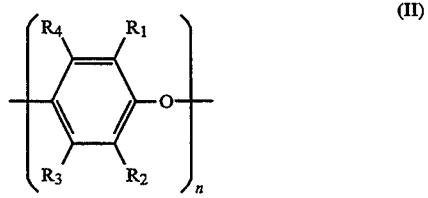

wherein $R_1$, $R_2$, $R_3$, and $R_4$ each individually represent a monovalent substituent such as hydrogen, halogen, alkyl, aryl, alkoxy and other hydrocarbon groups, with at least one of $R_1$, $R_2$, $R_3$ and $R_4$ not being hydrogen, and n represents the degree of polymerization. Preferably, n is at least 20, and more preferably, n is at least 50.

The polyphenylene ether resins suitable for use in the thermoplastic blend compositions of the present invention are well known in the art and may be prepared by any of a number of processes known in the art from corresponding phenols or reactive derivatives thereof. Examples of suitable polyphenylene ether resins and methods for their production are set forth in the Hay U.S. Pat. Nos. 3,306,874 and 3,306,875, and in the Yonemitsu et al U.S. Pat. No. 4,011,200, all of which are incorporated herein by reference. Preferred phenylene ether resins (or PPE resins) useful for the purposes of this invention include both the homopolymers prepared by the oxidative coupling of a 2,6-dialkylphenol as disclosed for example in U.S. Pat. No. 3,306,874, as well as the copolymers of 2,6-diakylphenols and 2,3,6-trialkylphenols described in U.S. Pat. No. 4,011,200. In general, these resins are prepared by oxidative coupling of a 2,6-dialkylphenol such as 2,6-dimethylphenol or a mixture of a 2,6-dialkylphenol and a 2,3,6-trialkylphenol such as 2,3,6-trimethylphenol. In forming preferred copolymers suitable for the practice of this invention, the proportion of 2,3,6-trialkylphenol will lie in the range of from about 2 to about 50 weight percent based on total polyphenylene ether. Particularly preferred copolymers will comprise from about 2 to 20 weight percent, more preferably from about 2 to about 10 weight percent 2,3,6-trialkylphenol, and, correspondingly from about 98 to about 80, more preferably from about 98 to about 90 weight percent 2,6-dialkylphenol. The synthesis of these homopolymers and copolymers by a variety of oxidative coupling processes is well known in the art, and such polymers have become available to the art from commercial sources. Throughout the Specification and Claims the term "polyphenylene ether" includes substituted polyphenylene ether and substituted polyphenylene ether copolymers, and mixtures thereof.

The polyester which is included in the blend compositions of the present invention is preferably a linear polyester comprising a condensation product of a diol and a dicarboxylic acid or ester thereof. Examples of preferred linear polyesters are polyalkylene terephthalates such as polyethylene terephthalate, modified polyethylene terephthalate wherein part of the diol is 1,4-cyclohexanedimethanol, polybutylene terephthalate, and homologs thereof, and aromatic diol esters of aromatic dicarboxylic acids, such as those listed in the Berry U.S. Pat. No. 3,647,921. The preferred polyester is polybutylene terephthalate for reasons of the good balance of properties which it provides the blends and its ready availability.

Polybutylene terephthalate for use in the preferred embodiment of the present invention is a condensation polymer having alternate repeating units derived from 1,4-butylene glycol and terephthalic acid. Polybutylene terephthalic is generally prepared commercially by a polycondensation reaction of dimethyl terephthalate with 1,4-butanediol. For the purposes of the present invention, the ordinary commercial polybutylene terephthalates may be used, but in addition, the slightly modified polybutylene terephthalates containing minor amounts of other diols, polyols, dicarboxylic acids, and polycarboxylic acids may be employed. Where the functionality of the component is greater than two, the polymer may include a small amount of branching but is substantially linear, as contrasted to crosslinked polyester resins which are not preferred for use in the present invention. polybutylene terephthalates as described at line 27, column 3 to line 10, column 4 of U.S. Pat. No. 4,123,410 may also be used.

According to the present invention, the polyester is modified with hydroxy- or carboxy-terminated polystyrene. Preferably the polyester is modified with hydroxy- or carboxy-terminated polystyrene macromer. The polyester may be modified by incorporating blocks of the hydroxy- or carboxy-terminated polystyrene into the polyester by cocondensation during the original esterification. Alternatively, the polyester may be modified with the polystyrene in a preblending melt-blending step, with or without the use of a transesterification catalyst. The hydroxy- or carboxy-terminated polystyrene and polyester modified therewith include, but are not limited to, those described in the Falk et al U.S. Pat. No. 4,217,427. Other suitable hydroxy- or carboxy-terminated polystyrenes which may be used to modify the polyester according to the present invention include those made by ARCO under the tradename Macromer, such as Macromer 4501.

The blend compositions of the invention preferably include from about 5 to about 95 weight percent of the polyphenylene ether and from about 95 to about 5 weight percent of the modified polyester, based on the combined weight of the polyphenylene ether and the polyester. More preferably, the compositions contain about 25 to 75 weight percent of polyphenylene ether and about 75 to 25 weight percent modified polyester. The modified polyester contains the hydroxy- or carboxy-terminated polystyrene in an amount sufficient to provide increased compatibility between the polyphenylene ether and the polyester as evidenced by improved properties. Preferably, the modified polyester contains from about 0.1 to about 15 weight percent of the hydroxy- or carboxy-terminated polystyrene, based on the weight of the polyester and the polystyrene. More preferably, the modified polyester contains from about 1 to about 10 weight percent of the polystyrene.

Other ingredients may be present in the blend compositions of the invention such as colorants, fillers, reinforcing agents, antistats, electroconductive additives, stabilizers, plasticizers, mold release agents, impact modifiers, flow promoters, and such other polymer additives as are known to those skilled in the art of polymer blend compounding and compositions.

For example, the blend compositions according to the present invention may further include one or more impact modifiers known in the art. Preferred impact modifiers comprise rubbery high molecular weight polymers. Rubbery high molecular weight polymers may comprise natural and/or synthetic polymeric materials. More particularly, the rubbery high molecular weight polymer materials may comprise natural rubber, thermoplastic elastomers, homopolymers and copolymers, including random, block and graft copolymers which are well-known in the art. Specific examples of the rubbery high molecular weight polymer materials include, but are not limited to, natural rubber, butadiene polymers, rubbery styrene copolymers, high impact polystyrenes, butadiene/styrene graft and block copolymers, isoprene polymers, chlorobutadiene polymers, butadiene/acrylonitrile copolymers, isobutylene polymers, isobutylene/butadiene copolymers, isobutylene/isoprene copolymers, acrylic ester polymers, ethylene propylene copolymers, ethylene/propylene/diene copolymers, thiokol rubber, polysulfide rubber, polyurethane rubber, and epichlorohydric rubber. Additionally, any of the aforementioned rubbery materials may be modified with an acid or anhydride as is known in the art for use in the blend compositions of the present invention. Preferred impact modifiers comprise AB and ABA type block copolymers comprising monoalkenyl arene blocks and hydrogenated, partially hydrogenated, and nonhydrogenated conjugated diene blocks. The impact modifier may be included in the thermoplastic blend compositions according to the present invention in an amount of from about 1 to about 50 weight percent and, preferably in an amount of from about 5 to about 25 weight percent, based on the weight of the polyphenylene ether, the modified polyester and the impact modifier.

The compositions of the invention may be prepared by blending the polyphenylene ether and the modified polyester, and any additional components, according to methods well known in the polymer art. For example, an intimate mixture of the components may be made by dry blending and then compression molding. Alternatively, thermal processing in a metal mixing device such as a Banbury or Henschel mixer, a heated roll mill, or an extruder may be used to provide a suitable resin blend. Various combinations or sequences of these steps may be used, provided that thorough melt mixing is accomplished. Thorough mixing of the components is advantageous for good physical properties.

The practice of the invention will be more fully understood by consideration of the following illustrative examples. In these examples, the term "parts" is meant to designate parts by weight.

EXAMPLE 1

A dry blend was made of the following ingredients: 52 parts of a modified polyester prepared by melt mixing 50 parts of polybutylene terephthalate (Celanese 2002) with 2 parts of Macromer 4501, a hydroxy-terminated polystyrene made by ARCO, and 50 parts of polyphenylene ether comprising a copolymer of 2,6-dimethylphenol and 2,3,6-trimethylphenol. The blend was intimately mixed by passing through an extruder and molded into test bars. The notched Izod impact (according to ASTM-D256) of these bars was found to be 0.3, the heat distortion temperature (according to ASTM-D648) at 264 psi was 333° F., and the bars had a smooth glossy surface. Bars similarly produced using polybutylene terephthalate which had not been modified with the hydroxy-terminated polystyrene had a notched Izod rating of 0.1, a heat distortion temperature of 304° F., and a rough surface appearance.

EXAMPLE 2

A blend of 50 parts of polyphenylene ether comprising a copolymer of 2,6-dimethylphenol and 2,3,6-trimethylphenol, 10 parts of high impact polystyrene, and 52 parts of a modified polyester formed by preblending 50 parts of polybutylene terephthalate (Gaftur 46022, an impact-modified polybutylene terephthalate made by GAF) and 2 parts of hydroxy-terminated polystyrene. This blend was mixed thoroughly by passage through an extruder and molded into bars.

The test bars exhibited a heat distortion temperature of 228° F. and a notched Izod impact of 0.7. The solvent resistance of the bars was determined to be much greater than that of a commercial blend of the same polyphenylene ether copolymer with high impact polystyrene, ethylene propylene rubber, and butadiene-styrene copolymer rubber, and was comparable to a blend of the same polyphenylene ether with nylon, a standard for high solvent resistance. The moisture absorption was 0.4% and the mold shrinkage was 1.1%, both less than is customarily observed with blends of nylon with the same polyphenylene ether. The melt flow of the blend of the invention was 3800 poise at 550° F. and 500/sec. which is better than that of the commercial blend of polyphenylene ether with high-impact polystyrene, ethylene propylene rubber and butadiene-styrene copolymer rubber.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A process for the preparation of blends of a polyester and a polyphenylene ether, which comprises:
   (a) modifying said polyester with a hydroxy- or carboxy-terminated polystyrene, the hydroxy- or carboxy-terminated polystyrene being included in an amount sufficient to improve notched Izod impact, heat distortion temperature or smooth surface appearance; and then
   (b) blending the resultant modified polyester with the polyphenylene ether.

2. A process as defined by claim 1, wherein the polyester and the polystyrene are blended by melt mixing.

3. A process as defined by claim 1, wherein the modified polyester and the polyphenylene ether are blended by melt mixing.

4. A process as defined by claim 1, wherein from about 5 to 95 weight percent polyphenylene ether is blended with from about 5 to 95 weight percent modified polyester, based on the total weight of the polyphenylene ether and the modified polyester.

5. A process as defined by claim 4, wherein from about 25 to 75 weight percent polyphenylene ether is blended with from about 25 to 75 weight percent modified polyester.

6. A process as defined by claim 1, wherein the polyester is modified with about 0.1 to 15 weight percent of the polystyrene, based on the total weight of the polyester and the polystyrene.

7. A process as defined by claim 1, wherein the polyester comprises a linear polyester.

8. A process as defined by claim 7, wherein the polyester comprises a polyalkylene terephthalate.

9. A process as defined by claim 8, wherein the polyester comprises polybutylene terephthalate.

10. A process as defined by claim 1, wherein the polyphenylene ether is a product of the oxidative polymerization of 2,6-dimethylphenol.

11. A process as defined by claim 1, wherein the polyphenylene ether is a product of the oxidative copolymerization of 2,6-dimethylphenol and 2,3,6-trimethylphenol.

* * * * *